3,390,145
WATER-INSOLUBLE MONOAZO DYES
Hans Guenter Wippel, Ludwigshafen (Rhine), Germany, assignor to Badische Anilin- & Soda-Fabrik Aktiengesellschaft, Ludwigshafen (Rhine), Germany
No Drawing. Filed Jan. 17, 1966, Ser. No. 520,867
Claims priority, application Germany, Jan. 20, 1965, B 80,179
7 Claims. (Cl. 260—158)

This invention relates to new water-insolube monoazo dyes having the general formula:

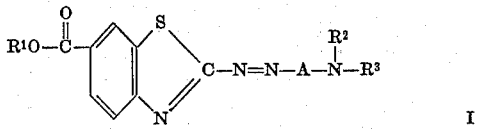

in which $R^1$ denotes an unsubstituted or substituted alkyl radical; $R^2$ denotes an unsubstituted or substituted alkyl radical; $R^3$ denotes a hydrogen atom or an unsubstituted or substituted alkyl radical and A denotes an unsubstituted or substituted p-phenylene radical, the dyes being free from ionic water-solubilizing groups such as free sulfonic acid proups or free carboxylic acid groups.

Examples of radicals $R^1$ are methyl, ethyl, propyl, butyl, pentyl and hexyl. These radicals may contain substituents, such as a cyano, hydroxy, alkoxy, acetylamino or carbalkoxy group or a chlorine or bromine atom.

Radicals $R^2$ and $R^3$ may for example contain halogen atoms or nitrile, hydroxyl, alkoxy, acyloxy or carbalkoxy groups as substituents.

Specific examples of the radicals $R^2$ and $R^3$ are: methyl, ethyl, propyl, butyl, β-cyanoethyl, β-hydroxyethyl, β,γ-dihydroxypropyl, β-hydroxy-γ-chloropropyl, carbomethoxyethyl, carboethoxyethyl, carbomethoxypropyl, acetoxyethyl, methoxypropyl, ethoxyethyl, ethoxypropyl, methoxyethyl, β-chloroethyl, butan-3-one-1-yl.

The radical

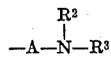

in the new dyes may be, for example, derived from:
N-ethylaminobenzene,
N-butylaminobenzene,
N-cyanoethylaminobenzene,
N-methoxyethyl-3-methylbenzene,
N-cyanoethyl-3-chlorobenzene,
N,N-diethylaminobenzene,
N-ethyl-N-β-hydroxyethylaminobenzene,
N-ethyl-N-β-cyanoethylaminobenzene,
N-β-hydroxyethyl-N-β-cyanoethylaminobenzene,
N-ethyl-N-β-acetoxyethylaminobenzene,
N-ethyl-N-β-methoxyethylaminobenzene,
N-β-acetoxyethyl-N-β-cyanoethylaminobenzene,
N,N-di-(β-hydroxyethyl)-aminobenzene,
N-β-carbomethoxyethyl-N-β-hydroxyethylaminobenzene,
N-β-acetoxyethyl-N-β-hydroxyethylaminobenzene,
N-β-methoxyethyl-N-β-hydroxyethylaminobenzene,
N-β-methoxyethyl-N-β-cyanoethylaminobenzene,
N-β-methoxyethyl-N-β-carbomethoxyethylaminobenzene,
N-β-methoxyethyl-N-β-acetoxyethylaminobenzene,
N-β-methoxyethyl-N-(butan-3-one-1-yl)-aminobenzene,
N-ethyl-N-β-cyanoethyl-3-methylaminobenzene,
N-ethyl-N-β-hydroxyethyl-3-methylaminobenzene,
N-ethyl-N-γ-acetylaminopropyl-3-methylaminobenzene,
N,N-di-(β-hydroxyethyl)-3-methylaminobenzene,
N-β-cyanoethyl-N-β-hydroxyethyl-3-methylaminobenzene,
N-β-cyanoethyl-N-β-methoxyethyl-3-methylaminobenzene,
N-β-cyanoethyl-N-butyl-3-methylaminobenzene,
N-β-hydroxyethyl-N-butyl-3-methylaminobenzene,
N-β-chloroethyl-N-butyl-3-methylaminobenzene,
N-β-chloroethyl-N-β-methoxyethyl-3-methylaminobenzene,
N,N-di-(β-hydroxyethyl)-3-chloroaminobenzene,
N-β-hydroxyethyl-N-β-cyanoethyl-3-chloroaminobenzene,
N,N-di-(β-hydroxyethyl)-3-acetylaminoaminobenzene,
N-β-hydroxyethyl-N-β-cyanoethyl-3-acetylaminoaminobenzene,
N,N-di-(β-hydroxyethyl)-2-methoxy-5-acetylaminoaminobenzene and
N-β-hydroxyethyl-N-β-cyanoethyl-2-methoxy-5-acetylaminoaminobenzene.

For technical reasons, those dyes of the invention are preferred which have the general formula II:

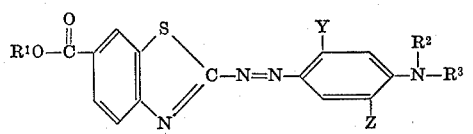

in which Y denotes a hydrogen atom, an alkyl or alkoxy group having one to four carbon atoms, a trifluoromethyl group, an acylamino group having not more than four carbon atoms, or a halogen atom, Z denotes a hydrogen atom or an alkyl or alkoxy group having not more than four carbon atoms and $R^1$, $R^2$ and $R^3$ have the above meanings.

Of the dyes having the formula II, those in turn are particularly suitable in which Y denotes hydrogen, methyl, chloro or acylamino and Z denotes hydrogen. Unsubstituted and substituted ethyl radicals are preferred for the radicals $R^1$, $R^2$ and $R^3$, especially $C_2H_4R^4$ and $C_2H_4R^5$ for $R^2$ and $R^3$ ($R^4$ and $R^5$ denoting nitrile, chloro, hydroxyl, alkoxy with one to four carbon atoms or carbalkoxy with two to four carbon atoms).

The new dyes are eminently suitable, particularly in finely divided form, for dyeing materials, particularly textile materials, such as fibers, filaments, yarn, flock, woven cloth and knitted fabric of acetylcellulose (secondary acetate and triacetate), linear polyesters, for example from terephthalic acid and ethylene glycol or 1,4-dimethylolcyclohexane and polyamides, for example from caprolactam or from hexamethylene diamine and adipic acid.

The dyeings obtained are distinguished by good fastness and good affinity. In many cases the excellent wet, light, gas fume fading and thermal fastness is particularly noteworthy.

For example the dye in which $R^1$ is ethyl, $R^2$ is hydroxyethyl, $R^3$ is methoxyethyl and Y and Z are both hydrogen is particularly remarkable. It gives excellent ruby dyeings on secondary acetate rayon.

The new dyes may be prepared by methods known per se by condensation or azo coupling, preferably by coupling diazo compounds of amines having the general formula:

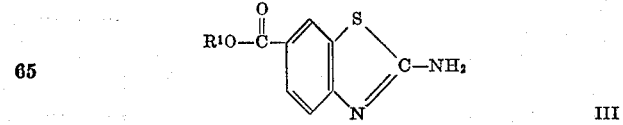

with compounds having the formula:

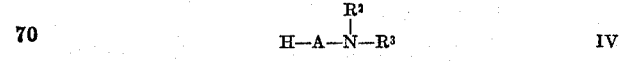

in which $R^1$, $R^2$, $R^3$ and A have the above meanings.

EXAMPLE 1

50 parts of a mixture of anhydrous acetic acid and propionic acid (17:3) is allowed to flow at 0° to 5° C. while stirring into a mixture of 18 parts of nitrosylsulfuric acid having a content of 12.1% of dinitrogen trioxide and 17 parts of concentrated sulfuric acid, and then 13.75 parts of 2-amino-6-carboethoxybenzothiazole is added to this mixture at 0° to 5° C. Then another 50 parts of the said mixture of acetic acid and propionic acid is added and three hours later 2 parts of urea is added with further stirring at 0° to 5° C. The clear diazo solution obtained is allowed to flow gradually at 0° to 5° C. into a solution of 8.25 parts of N-hydroxyethyl-N-ethyl-aniline, 25 parts of water, 6 parts of concentrated hydrochloric acid and 100 parts of ice. The reaction mixture is neutralized with a solution of 60 parts of sodium acetate in 300 parts of water and stirred for twelve hours. The crystalline dye is suction filtered, washed with water until neutral and dried at 50° C. at subatmospheric pressure. The dye thus obtained dyes acetate rayon bright ruby red shades having very good fastness to gas fume fading and fastness to light.

By using the azo components listed in the following table, instead of the coupling component specified in Example 1, dyes having similar properties are obtained.

| Example No. | Coupling component | Shade of dyeing on— | | |
|---|---|---|---|---|
| | | Acetate rayon | Polyamide | Polyester |
| 2 | 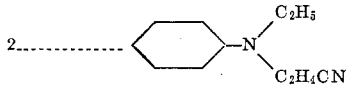 | Red | Red | Red. |
| 3 | 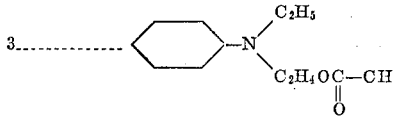 | Ruby | Red | Red. |
| 4 | 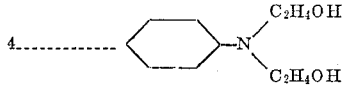 | ....do.... | Ruby | Red. |
| 5 | 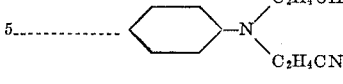 | Salmon | Red | Red. |
| 6 | 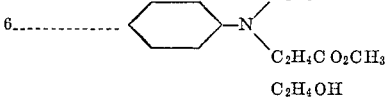 | Rose | Red | Red. |
| 7 | 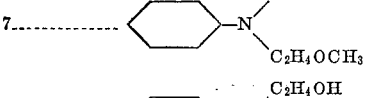 | Ruby | Ruby | Red. |
| 8 | 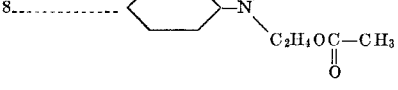 | ....do.... | ....do.... | Red. |
| 9 | 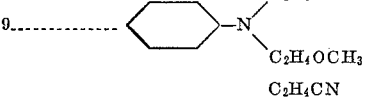 | ....do.... | ....do.... | Red. |
| 10 | 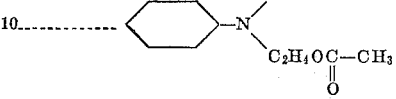 | Red | Red | Red. |
| 11 | 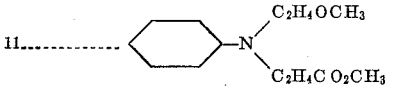 | Scarlet | Red | Red. |
| 12 | 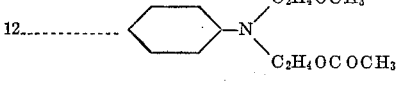 | Ruby | Ruby | Red. |
| 13 | 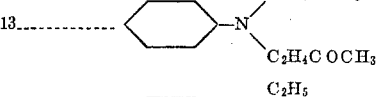 | Red | Red | Red. |
| 14 | 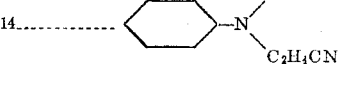 | Rose | Scarlet | Scarlet. |

| Example No. | Coupling component | Shade of dyeing on— | | |
|---|---|---|---|---|
| | | Acetate rayon | Polyamide | Polyester |
| 15 | 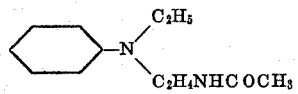 | Ruby | Ruby | Ruby. |
| 16 | 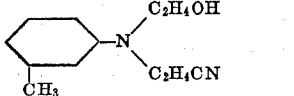 | Rose | Red | Red. |
| 17 | 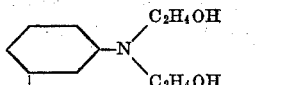 | Ruby | Ruby | Red. |
| 18 | 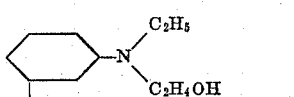 | Claret | Claret | Ruby. |
| 19 | 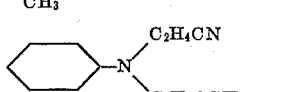 | Ruby | Ruby | Red. |
| 20 | 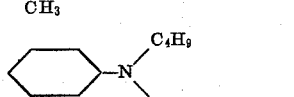 | Rose | Scarlet | Scarlet. |
| 21 | 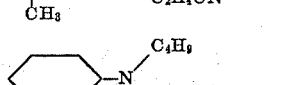 | ...do... | ...do... | Do. |
| 22 | 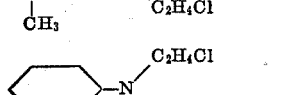 | Ruby | Ruby | Red. |
| 23 | 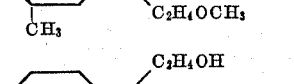 | ...do... | ...do... | Red. |
| 24 | 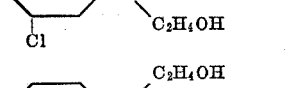 | Red | Red | Red. |
| 25 | 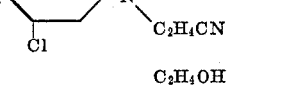 | Ruby | Claret | Ruby. |
| 26 | 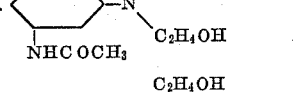 | ...do... | Red | Red. |
| 27 | 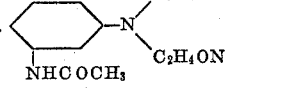 | Violet | Blue | Violet. |
| 28 | 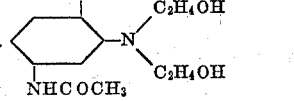 | ...do... | Violet | Do. |

Similar dyes are obtained by diazotizing 2-amino-6-carbomethoxybenzothiazole, 2-amino - 6 - carbopropoxybenzothiazole or 2-amino - 6 - carbobutoxybenzothiazole (instead of 2-amino-6-carboethoxybenzothiazole) and coupling the diazo compound with the coupling components set out in the table.

I claim:
1. A dye of the formula:

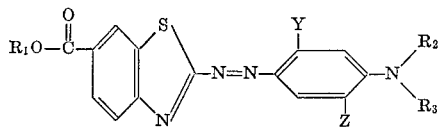

wherein:
$R_1$ represents an alkyl radical having 1 to 4 carbon atoms,
$R_2$ represents an alkyl radical having 1 to 4 carbon atoms or an alkyl radical having 1 to 4 carbon atoms and being substituted by a hydroxy, methoxy or acetyloxy group,
$R_3$ represents an alkyl radical having 1 to 4 carbon atoms and being substituted by a hydroxy, cyano, acetyloxy, carbomethoxyacetyl, acetylamino or chloro group,
Y represents hydrogen, chloro, methyl or acetylamino, and
Z represents hydrogen or methoxy.

2. A dye according to claim 1 having the formula:

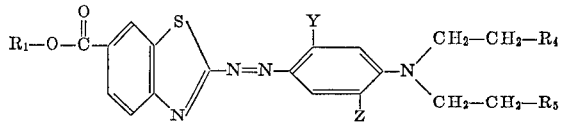

wherein:
$R_1$ represents an alkyl radical having 1 to 4 carbon atoms,
Y represents hydrogen, chloro, methyl or acetylamino,
Z represents hydrogen or methoxy,
$R_4$ represents hydrogen, hydroxy, methoxy or acetyloxy, and
$R_5$ represents hydroxy, cyano, acetyloxy, carbomethoxyacetyl, acetylamino or chloro.

3. The dye according to claim 1 and having the formula:

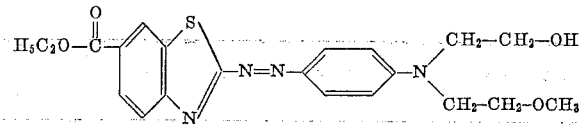

4. The dye according to claim 1 and having the formula:

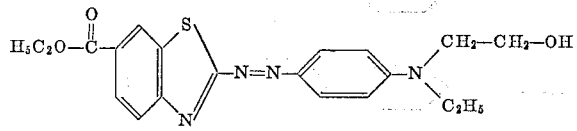

5. The dye according to claim 1 and having the formula:

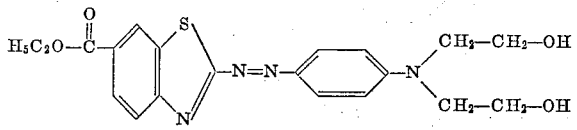

6. The dye according to claim 1 and having the formula:

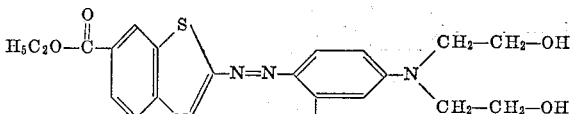

7. The dye according to claim 1 and having the formula:

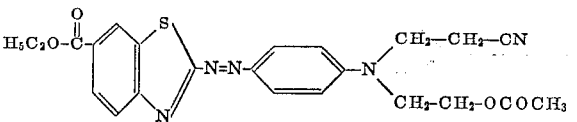

References Cited

UNITED STATES PATENTS 3,329,669    7/1967    Sartori _____ 260—158

CHARLES B. PARKER, *Primary Examiner.*

D. M. PAPUGA, *Assistant Examiner.*

UNITED STATES PATENT OFFICE
CERTIFICATE OF CORRECTION

June 25, 1968

Patent No. 3,390,145

Hans Guenter Wippel

It is certified that error appears in the above identified patent and that said Letters Patent are hereby corrected as shown below:

Column 8, line 43, "3,329,669" should read -- 3,329,667 --.

Signed and sealed this 16th day of December 1969.

(SEAL)
Attest:

Edward M. Fletcher, Jr.
Attesting Officer

WILLIAM E. SCHUYLER, JR.
Commissioner of Patents